(12) United States Patent
Dorwarth et al.

(10) Patent No.: US 7,514,939 B2
(45) Date of Patent: Apr. 7, 2009

(54) METHOD FOR EVALUATING A POTENTIOMETER AND CIRCUIT ARRANGEMENT HAVING A POTENTIOMETER

(75) Inventors: Ralf Dorwarth, Oberderdingen (DE); Wilfried Schilling, Kraichtal (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 0 days.

(21) Appl. No.: 11/941,639

(22) Filed: Nov. 16, 2007

(65) Prior Publication Data

US 2008/0094080 A1  Apr. 24, 2008

Related U.S. Application Data

(63) Continuation of application No. PCT/EP2006/004649, filed on May 17, 2006.

(30) Foreign Application Priority Data

May 18, 2005  (DE) ........................ 10 2005 023 717

(51) Int. Cl.
G01R 27/08 (2006.01)
G01R 31/08 (2006.01)

(52) U.S. Cl. .................... 324/714; 324/523

(58) Field of Classification Search .......... 324/714, 324/713, 691, 649, 600, 723, 73.1; 374/168; 318/663, 628, 600, 567, 295; 338/89; 330/178; 388/824, 838; 702/107

See application file for complete search history.

(56) References Cited

U.S. PATENT DOCUMENTS

| 4,461,021 | A | * | 7/1984 | Schwarz et al. | ................. 381/2 |
|---|---|---|---|---|---|
| 4,527,943 | A | * | 7/1985 | McCormick | ................. 414/666 |
| 6,396,283 | B1 | * | 5/2002 | Kimoto | ................. 324/523 |
| 6,577,297 | B1 | | 6/2003 | Wright | |
| 6,809,531 | B2 | * | 10/2004 | Slye et al. | ................. 324/714 |
| 2006/0139143 | A1 | | 6/2006 | Ruettiger | |

FOREIGN PATENT DOCUMENTS

| DE | 3522775 | 1/1987 |
|---|---|---|
| DE | 4000521 | 7/1991 |
| DE | 4322472 | 1/1995 |
| DE | 19728596 | 1/1999 |
| DE | 19812839 | 9/1999 |
| FR | 2731070 | 8/1996 |

OTHER PUBLICATIONS

International Search Report from PCT/EP2006/0004649, dated Aug. 21, 2006.
German Search Report from German Application No. 10 2005 023 717.7.

\* cited by examiner

*Primary Examiner*—Timothy J Dole
*Assistant Examiner*—Hoai-An D Nguyen
(74) *Attorney, Agent, or Firm*—Alston & Bird LLP

(57) ABSTRACT

A potentiometer (PT1, PT2) has a first terminal (A1), a second terminal (A2) and an intermediate tap (ZA), a resistor being between the first terminal (A1) and the second terminal (A2) irrespective of the position of the potentiometer (PT1, PT2). In an evaluation method, a first drive voltage (GND) and at least one second drive voltage (VS), which is different than the first drive voltage, are applied to the first terminal (A1) and/or the second terminal (A2) and/or a third drive voltage (VS) is applied to the intermediate tap (ZA). The evaluation can be made from the different measurement voltages measured at the terminals.

7 Claims, 1 Drawing Sheet

METHOD FOR EVALUATING A POTENTIOMETER AND CIRCUIT ARRANGEMENT HAVING A POTENTIOMETER

CROSS REFERENCE TO RELATED APPLICATIONS

This application is a continuation of PCT/EP2006/004649, filed May 17, 2006, which in turn claims priority to DE 10 2005 023 717.7, filed on May 18, 2005, the contents of both of which are incorporated by reference.

FIELD OF INVENTION

The invention relates to a method for evaluating a potentiometer and circuit arrangement.

BACKGROUND OF THE INVENTION

When using potentiometers for rotary toggle controls, e.g., for activating or de-activating and adjusting the temperature of a hotplate of a hob or oven, generally there is no additional master switch for activating or deactivating the hotplate or oven. Deactivation of the hotplate or oven should, however, still be reliably possible in the case of a fault or a defect to the potentiometer or control device. Various different solutions are known for this.

In one such solution, the potentiometer can be constructed as a double potentiometer, where a second, redundant potentiometer is provided. However, such double potentiometers are comparatively expensive. Moreover an output voltage of the additional potentiometer must be evaluated, so that there is a need for a further associated, analog measurement terminal within the control device.

A further possibility is provided by the use of an additional power switch or power contact, which is in operative connection with the rotary toggle and, independently of the toggle position determined by the potentiometer, interrupts a supply voltage of an associated heater element in an off position of the rotary toggle. Apart from the costs caused by the additional power switch, there is an increased cabling expenditure on the mains voltage side, so that the manufacturing costs also rise.

On using so-called code switches, e.g., with a Gray code, for determining the rotary toggle position, an off position can be detected by an additional slider path specifically provided for this purpose. However, the additional slider path increases the manufacturing costs. Furthermore, for evaluating the slider path position, there must be a further associated evaluation terminal within the control device.

Therefore, there is a need for the provision of a method for evaluating a potentiometer, as well as a circuit arrangement having a potentiometer of the aforementioned type, which permits a reliable evaluation of a conventional potentiometer with respect to its functionality and the potentiometer position and which can be inexpensively implemented with limited space demands.

BRIEF DESCRIPTION OF THE DRAWING

An advantageous embodiment of the invention is diagrammatically represented in the drawing and is described hereinafter wherein.

DETAILED DESCRIPTION

Figure 1:
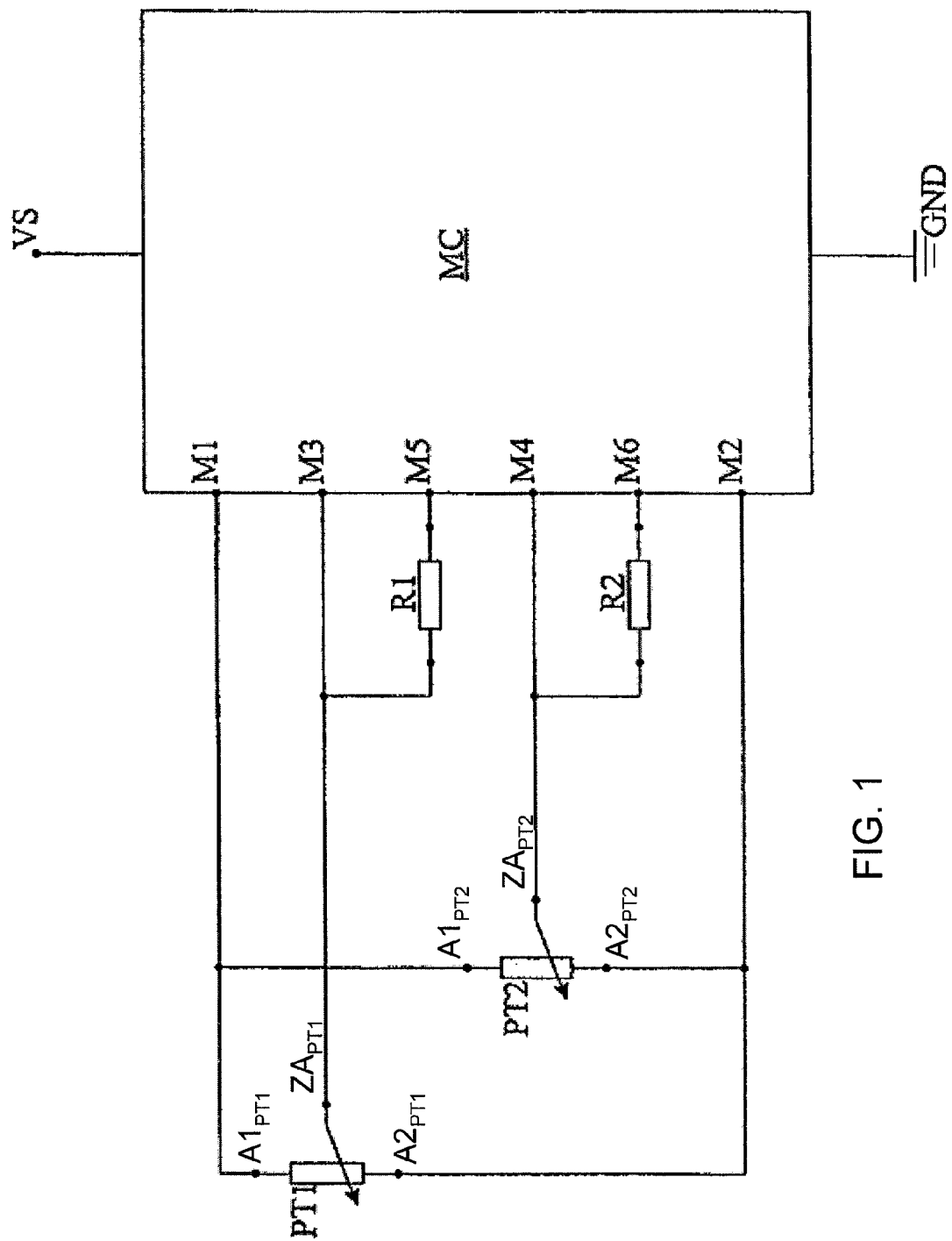
FIG. 1 illustrates one embodiment involving a circuit diagram of a circuit arrangement for the evaluation of several potentiometers.

An embodiment of the invention provides a method having the features of claim 1 and a circuit arrangement having the features of claim 7. Other advantageous and preferred developments of the invention form the subject matter of further claims and are further explained hereinafter. By express reference the wording of the claims is made into part of the content of the description. Some of the subsequently enumerated features and characteristics apply both to the method and the circuit arrangement and are in part only described once, but independently of one another apply both to the method and the circuit arrangement.

According to the invention for evaluating a potentiometer, which has a first terminal, a second terminal and an intermediate tap, the first terminal and/or the second terminal is subject to the action of a first drive voltage and at least one second drive voltage, which differs from the first drive voltage and/or a third drive voltage is applied to the intermediate tap. A resistance value between the first and second terminals is independent of the potentiometer position. The third drive voltage can be identical or differ from the first or second drive voltage. If the terminals or center tap of the potentiometer are not, in conventional manner, in each case applied to static potentials, in addition to the evaluation or determination of a potentiometer position, it is also possible to carry out a check of the correct function of the potentiometer, so that certain systematic fault or error scenarios can be reliably detected. If a fault is detected, it is e.g., possible to switch off a load controlled by the potentiometer, which obviates the need for additional security measures, e.g., the provision of a further redundant potentiometer.

According to a further development of the method the first drive voltage is applied to the first terminal of the potentiometer, the second drive voltage is applied to the second terminal of the potentiometer and a first measurement voltage at the intermediate terminal is measured and stored. Subsequently the second drive voltage is applied to the first terminal of the potentiometer and the first drive voltage is applied to the second terminal of the potentiometer and a second measurement voltage at the intermediate tap is measured. Through the evaluation of the first and second measurement voltages, both the operability and the potentiometer position can be established. The potentiometer is preferably established as functional if the sum of the first and second measurement voltages is equal to the difference between the second and first applied drive voltage. This relationship between the drive voltages and the measurement voltages arises theoretically when the potentiometer is functioning correctly. If said condition is not fulfilled, the presence of a fault can be concluded.

In a further development of the method the first drive voltage is a supply voltage and the second drive voltage a ground voltage of an electric circuit arrangement having the potentiometer. This permits an evaluation of the potentiometer with the already present voltage levels, which reduces the necessary circuitry costs.

In a further development of the method, in the case that the intermediate tap is subject to the third drive voltage, a third measurement voltage is measured at the first terminal and a fourth measurement voltage is measured at the second terminal, wherein the third measurement voltage and the fourth measurement voltage are in each case evaluated for determining potentiometer operability. The first and second terminals are obviously not supplied with a voltage during the measurement. Preferably the potentiometer is determined as operational if the third measurement voltage and fourth measurement voltage coincide with the third drive voltage. Assuming a correct wiring or cabling of the potentiometer, the third and fourth measurement voltages must be equal to the third drive voltage. If this is not the case, the presence of a malfunction, e.g. a defective potentiometer and/or faulty cabling can be concluded.

An embodiment of the inventive circuit arrangement, especially for performing the aforementioned method, comprises a potentiometer, which has a first terminal, a second terminal and an intermediate tap, a resistance value between the first and second terminals being independent of the potentiometer position and there is a microprocessor having a first terminal, a second terminal and a third terminal. The first and second terminals are in each case configurable for outputting a first voltage and at least one second voltage differing from the first voltage. The third terminal is configurable for measuring an analog voltage, the first terminal of the potentiometer being connected to the first terminal of the microprocessor, the second terminal of the potentiometer is connected to the second terminal of the microprocessor and the potentiometer intermediate tap is connected to the third microprocessor terminal. As a result of the flexibility of modern microprocessors, whose terminals can generally be configured dynamically as outputs or inputs and specific terminals can additionally serve as analog inputs, with the aid of such a circuit arrangement a flexible signal sequence can be produced at the potentiometer terminals. The signals which arise can be evaluated at the terminals serving as inputs. Through dynamic reconfiguring of a terminal from an output to an input and vice versa, various potentiometer function tests can be easily performed.

In a further development of the circuit arrangement the first and second terminals are configurable as an input and the third input is configurable for outputting a voltage. This permits a test operation in which a voltage is applied to the potentiometer intermediate tap, which in the case of correct operation, must arise at the first and second potentiometer terminals. The applied and measured voltages can be of the type with a digital level, so that no analog input terminal is required and instead a digital input terminal suffices.

In a further development of the circuit arrangement, between the intermediate tap and a fourth microprocessor terminal or a switchable reference potential is connected a resistor. Then, with a suitable configuration of the microprocessor terminals, a resistance value of the potentiometer can be determined and used for function control purposes.

In a further embodiment of the circuit arrangement, at least one further potentiometer is provided, which also has a first terminal, a second terminal and an intermediate tap. A resistance value between the first and second terminals is independent of the position of the further potentiometer and the first terminal of the further potentiometer is connected to the first terminal of the microprocessor. The second terminal of the further potentiometer is connected to the second terminal of the microprocessor and the intermediate tap of the further potentiometer is connected to a fifth terminal of the microprocessor, which is configurable for the measurement of an analog voltage. This permits the cascading or connection in parallel of further similar potentiometers and for an added potentiometer, it is merely necessary to provide an associated analog input at the microprocessor. It is alternatively possible to provide a so-called analog multiplexer, to whose analog inputs are connected the intermediate taps of the potentiometer and whose output is connected to an analog input of the microprocessor.

These and further features can be gathered from the claims, description and drawing, the individual features being implementable individually or in subcombination form in an embodiment of the invention and in other fields and can represent advantageous, independently protectable constructions for which protection is claimed here. The subdivision of the application into individual sections and the subheadings in no way restrict the general validity of the statements made thereunder.

DETAILED DESCRIPTION OF THE EMBODIMENT

The drawing shows a diagram of a circuit arrangement with a first potentiometer PT1 and a second potentiometer PT2, which in each case have a first terminal A1, a second terminal A2 and an intermediate tap ZA. A resistor between the first terminal A1 and second terminal A2 is independent of a position of potentiometer PT1 or PT2 and has a constant, known value. A resistor between terminal A1 or A2 and intermediate tap ZA has a value dependent on the potentiometer position. A sum of the resistance between terminal A1 and terminal ZA and the resistance between terminal ZA and terminal A2 is equal to the resistance between terminals A1 and A2, a microprocessor MC with terminals M1 to M6, a first resistor R1 and a second resistor R2. The microprocessor is supplied by a supply voltage VS of e.g. 3 or 5V and is connected to ground GND.

The circuit arrangement is used for controlling a hob (not shown) with several heating devices associated with the potentiometers PT1 and PT2 and whose heating power is adjustable through the position of potentiometers PT1 and PT2. The control function is implemented by a program running on microprocessor MC. There can be a single potentiometer or also several potentiometers.

Terminals A1 and A2 of potentiometers PT1 and PT2 are in each case connected in between outputs M1 and M2 of microprocessor MC, i.e. terminals A1 are in each case connected to terminal M1 and terminals A2 to terminal M2. The terminals M1 and M2 of microprocessor MC can be configured dynamically or during the running time as digital outputs or digital inputs. If the terminals M1 and M2 are output-configured, either the ground voltage GND or the supply voltage VS is applied thereto, as a function of a soft-ware-side set value. If terminals M1 and M2 are input-configured, the terminals are in high impedance form and as a function of a voltage level at the terminal during a reading process a logic "1" or a logic "0" is read in.

Terminals M3 and M4 of microprocessor MC are dynamically configurable as analog inputs, digital inputs or digital outputs. If the terminals M3 or M4 are configured as analog inputs, a voltage level applied to terminal M3 or M4 is converted into a digital value during a conversion process. If the terminals are configured as digital inputs or out-puts, their function corresponds to those of terminals M1 and M2.

Resistor R1 is connected in between terminal M5 and terminal M3. Resistor R2 is connected between terminal M6 and terminal M4. Intermediate tap ZA of potentiometer PT1 is connected to terminal M3 and intermediate tap ZA of potentiometer PT2 is connected to terminal M4.

FUNCTION

The function of the circuit arrangement will now be described when used in the aforementioned hob.

Following the application of the supply voltage VS to microprocessor MC, during a first step the microprocessor configures its terminals M1, M2, M4, M5 and M6 as digital inputs and terminal M3 as an output. Microprocessor MC then applies to output M3 a level corresponding to a logic "1"

(e.g. 5V), and reads in the signal level detected at inputs M1, M2, M4, M5 and M6. As a result of the wiring configuration, a logic "1" must be read in at all inputs M1, M2, M4, M5 and M6. If this is not the case, the presence of a fault can be concluded, e.g. in the wiring of potentiometers PT1 or PT2. The microprocessor MC can then switch off all the heating devices or as a function of the signals read in at the inputs may only deactivate individual heating devices.

In a second step, the microprocessor MC then configures terminals M1, M2, M3, M5 and M6 as digital inputs and terminal M4 as an output, applies to output M4 a level corresponding to logic "1" and reads in the signals detected at inputs M1, M2, M3, M5 and M6. As a result of the wiring configuration, a logic "1" must be read in at inputs M1, M2, M3, M5 and M6. If this is not the case the presence of a fault can be concluded, e.g. in the wiring of potentiometer PT1 or PT2. The microprocessor MC can then switch off all the heating devices or, as a function of the signals read in at the inputs, may only deactivate individual heating devices.

The first and/or second steps are normally only performed in an initialization phase for the circuit arrangement. However, the steps can also be performed cyclically at given time intervals. In an alternative embodiment, a logical "0" in place of a "1" can be outputted at M3 or M4.

In a third step, the microprocessor MC then configures terminals M1 and M2 as outputs, terminals M3 and M4 as analog inputs and terminals M5 and M6 as digital inputs. Through the internal connection of terminal M1 to ground, a first drive voltage in the form of ground level GND is applied to M1 and to the first terminal A1 of potentiometers PT1 and PT2. Through the internal connection of terminal M2 to supply voltage VS, a second drive voltage in the form of supply voltage VS is applied to the second terminal A2 of potentiometers PT1 and PT2. As terminals M5 and M6 are connected in high impedance form, resistors RI and R2 have no effect. Voltages are now detected at terminals M3 and M4 which are dependent on the given position of potentiometers PT1 and PT2 and reflect the voltage difference between terminals A1 and A2 of potentiometers PT1 and PT2. Thus, e.g., at terminal M3, 2V may be detected, whereas at terminal M4 3V may be detected. On the basis of the digitized, first measurement voltage measured at terminals M3 and M4, the potentiometer position can be easily calculated in microprocessor MC.

In a fourth step, through the internal connection of terminal M1 to the supply voltage VS, microprocessor MC applies the second drive voltage VS to the first terminal A1 of both potentiometers PT1 and PT2. Through the internal connection of terminal M2 to ground voltage GND, the first drive voltage GND is applied to each second terminal A2 of potentiometers PT1 and PT2. As terminals M5 and M6 are connected in high impedance form, resistors R1 and R2 have no effect. If the potentiometer position between the third and fourth steps has remained unchanged, then the voltage between terminals A1 and A2 has been inverted (e.g., M3 detects 3V and M4 detects 2V), and the sum of the first measurement voltage measured at terminals M3 and M4 in step 3 and the corresponding, second measurement voltage measured in step 4 must be equal to the difference between the second and the first applied drive voltage, i.e. is e.g. 5V. If this is not the case it can be concluded that there is a fault, e.g. a defective potentiometer. As a result the microprocessor can switch off the heating device associated with the potentiometer and output an alarm message. Obviously the potentiometer position can also be calculated in this step.

In an optional fifth step, the possibility exists of carrying out a resistance measurement of potentiometers PT1 and PT2. Terminals M5 and M6, as well as resistors R1 and R2 are used for this. In this case terminals M5 and M6 are configured as outputs and terminals M1 to M4 are appropriately configured as inputs.

The resistance measurement is simplified if only one potentiometer is connected to outputs M1 and M2. In this case, further potentiometers or the potentiometer PT2 can be correspondingly connected to not shown terminal pairs of the microprocessor. In the case of only potentiometer PT1 being connected to terminals M1 and M2 (which is not shown in the embodiment of FIG. 1) for a resistance measurement of a resistor between terminals ZA and A2 of potentiometer PT1, the terminals M5 and M2 are configured as outputs, terminal M3 as an analog input and terminal M1 as an input. Then, at terminal M5, e.g. a voltage level corresponding to a logic "1" and at terminal M2 a voltage level corresponding to a logic "0" are outputted. Resistor R1 and the resistance of potentiometer PT1 between terminals ZA and A2 form a voltage divider, i.e., the voltage at terminal M3 results from the voltage difference of the two voltage levels and a ratio of resistor R1 and the potentiometer resistance between terminals ZA and A2. From the voltage measured at terminal M3, it is easily possible to calculate the resistance of potentiometer PT1 between terminals ZA and A2.

For the measurement of a resistance between the potentiometer terminals ZA and A1, the terminal M2 is configured as an input and terminal M1 as an output and once again a voltage level corresponding to a logic "0" is outputted at output M1. The resistance calculation takes place in the aforementioned manner. As a logic consistency check, it is possible to establish whether a sum of the measured resistance between terminals A1 and ZA and the measured resistance between terminals A2 and ZA corresponds to the total resistance of the potentiometer PT1 between terminals A1 and A2 known at the time of design.

In the embodiment described, the first terminal A1 and second terminal A2 of potentiometer PT1 or PT2 are alternately subject to the first drive voltage GND and the second drive voltage VS. For function testing within the framework of an initialization, the first and/or second drive voltage is additionally supplied to intermediate tap ZA.

The circuit arrangement disclosed permits a variable drive of the potentiometer terminals with different voltages, so that different operating modes can be set and different operating quantity calculations and plausibility calculations can be performed. This enables a power-saving operation, e.g. in standby operation of the control device, to be implemented through the terminals M1 and M2 of the microprocessor only producing a voltage difference between terminals A1 and A2 of potentiometers PT1 and PT2 at certain time intervals, e.g. every 200 ms. For this purpose, in the case of an active measurement, supply voltage VS is applied to terminal M1 and ground voltage GND to terminal M2 or vice versa. In the case of a non-active measurement, in each case VS or GND is applied to terminals M1 and M2, so that no current flows through potentiometers PT1 and PT2.

The described order of the method steps can also obviously be appropriately changed.

The invention claimed is:

1. A circuit arrangement comprising:
   a potentiometer (PT1), which is provided with a first terminal (A1), a second terminal (A2) and an intermediate tap (ZA), a resistance value between the first terminal (A1) and the second terminal (A2) being independent of a position of the potentiometer (PT1); and
   a microprocessor (MC) having a first microprocessor terminal (M1), a second microprocessor terminal (M2) and a third microprocessor terminal (M3), wherein the first microprocessor terminal (M1) and the second microprocessor terminal (M2) are configured for outputting a first drive voltage (GND) and at least one second drive voltage (VS) differing from the first drive voltage (GND) respectively to the first terminal (A1) and said second terminal (A2), and the third microprocessor terminal (M3) is configured for measuring an analog voltage present at the intermediate tap (ZA), wherein a) the first terminal (A1) of the potentiometer (PT1) is connected to the first microprocessor terminal (M1) of the microprocessor (MC),
b) the second terminal (A2) of the potentiometer (PT1) is connected to the second microprocessor terminal (M2) of the microprocessor (MC), and
c) the intermediate tap (ZA) of the potentiometer (PT1) is connected to the third microprocessor terminal (M3) of the microprocessor (MC)

wherein the microprocessor is adapted to:
supply the first drive voltage (GND) to the first terminal (A1) of the potentiometer (PT1);
supply the second drive voltage (VS) to the second terminal (A2) of the potentiometer (PT1);
measure and store a first analog measurement voltage at the intermediate tap (ZA);
supply the second drive voltage (VS) to the first terminal (A1) of the potentiometer (PT1);
supply the first drive voltage (GND) to the second terminal (A2) of the potentiometer (PT1);
measure and store a second analog measurement voltage at the intermediate tap (ZA); and
evaluate the first and second analog measurement voltages to determine the operability or the position of the potentiometer (PT1).

2. The circuit arrangement according to claim 1, wherein the first microprocessor terminal (M1) and second microprocessor terminal (M2) are configurable to receive an input and the third microprocessor terminal (M3) is configurable for outputting a voltage comprising either the first voltage or the one second drive voltage.

3. The circuit arrangement according to claim 1, wherein a resistor (R1) is connected between the intermediate tap (ZA) and a fourth microprocessor terminal (M5) of the microprocessor (MC) or a switchable reference potential (GND, VS).

4. The circuit arrangement according to claim 1, wherein at least one further potentiometer (PT2) is provided having a first terminal ($A1_{PT2}$), a second terminal ($A2_{PT2}$) and an intermediate tap ($ZA_{PT2}$), wherein a resistance value between the first terminal ($A2_{PT1}$) and the second terminal ($A2_{PT2}$) is independent of the position of the further potentiometer (PT2), the first terminal ($A1_{PT2}$) of the further potentiometer (PT2) is connected to the first terminal (M1) of the microprocessor (MC), the second terminal ($A2_{PT2}$) of the further potentiometer (PT2) is connected to the second terminal (M2) of the microprocessor (MC) and the intermediate tap ($ZA_{PT2}$) of the further potentiometer (PT2) is connected to a fifth terminal (M5) of the microprocessor (MC), which is configurable for measuring an analog voltage.

5. A method for a microprocessor to evaluate a potentiometer (PT1) having a first terminal (A1), a second terminal (A2) and an intermediate tap (ZA), a resistance value between the first terminal (A1) and the second terminal (A2) being independent of the position of the potentiometer (PT1), wherein said first terminal (A1) is connected to a first microprocessor terminal (M1), said second terminal (A2) is connected to a second microprocessor terminal (M2), and said intermediate tap (ZA) is connected to a third microprocessor terminal, said method comprising the steps of:
applying a first drive voltage (GND) to the first terminal (A1) of the potentiometer (PT1) by said microprocessor;
applying a second drive voltage (VS) to the second terminal (A2) of the potentiometer (PT1) by said microprocessor;
measuring and storing a first measurement voltage at the intermediate tap (ZA) by said microprocessor;
applying the second drive voltage (VS) to the first terminal (A1) of the potentiometer (PT1) by said microprocessor;
applying the first drive voltage (GND) to the second terminal (A2) of the potentiometer (PT1) by said microprocessor;
measuring and storing a second measurement voltage at the intermediate tap (ZA) by said microprocessor; and
evaluating the first and second measurement voltages in the microprocessor for determining the operability or the position of the potentiometer (PT1).

6. The method according to claim 5, wherein the potentiometer (PT1) is determined as operational if the sum of the first and second measurement voltages is equal to the difference between the second drive voltage (VS) and the first drive voltage (GND).

7. A method for evaluating a potentiometer by a microprocessor, said potentiometer having a first terminal, a second terminal, and an intermediate tap, wherein a resistance value between the first terminal and the second terminal is independent of a position of the potentiometer, said microprocessor configured to perform the steps of:
supplying a drive voltage to the intermediate tap;
measuring a first voltage at the first terminal;
measuring a second voltage at the second terminal; and
determining the potentiometer is operational if the first measurement voltage and the second measurement voltage coincide with the drive voltage (VS).

* * * * *